No. 736,211. PATENTED AUG. 11, 1903.
F. B. CASE.
PHOTOGRAPHIC CAMERA.
APPLICATION FILED DEC. 11, 1902.
NO MODEL.

Witnesses:
Albert C. Bell.
A. P. Morss.

Inventor
Frank B. Case.
By his Atty. W. H. Cooley.

No. 736,211.                                          Patented August 11, 1903.

UNITED STATES PATENT OFFICE.

FRANK B. CASE, OF ROCHESTER, NEW YORK.

PHOTOGRAPHIC CAMERA.

SPECIFICATION forming part of Letters Patent No. 736,211, dated August 11, 1903.

Application filed December 11, 1902. Serial No. 134,787. (No model.)

*To all whom it may concern:*

Be it known that I, FRANK B. CASE, a citizen of the United States, residing at Rochester, in the county of Monroe and State of New York, have invented an Improvement in Photographic Cameras, of which the following is a specification.

This invention relates to that class of cameras in which the lens-carriage and the bellows connecting the same to the camera-back is arranged to be folded up within the camera-back, and a door hinged to the bottom edge of such back swings outward and downward, so as to form a bed, carrying a suitable guide-plate upon which the lens-carriage is arranged to be adjustably secured for the purpose of focusing the camera.

The main feature of my present invention consists in an improved means for securing a swinging adjustment between the bed and back of a camera, so that the camera-back may be given a plumb position when it is necessary to point the lens either above or below a horizontal line, and thus eliminate the distortion that would necessarily result if such back could not be given such a plumb position.

Figure 1:
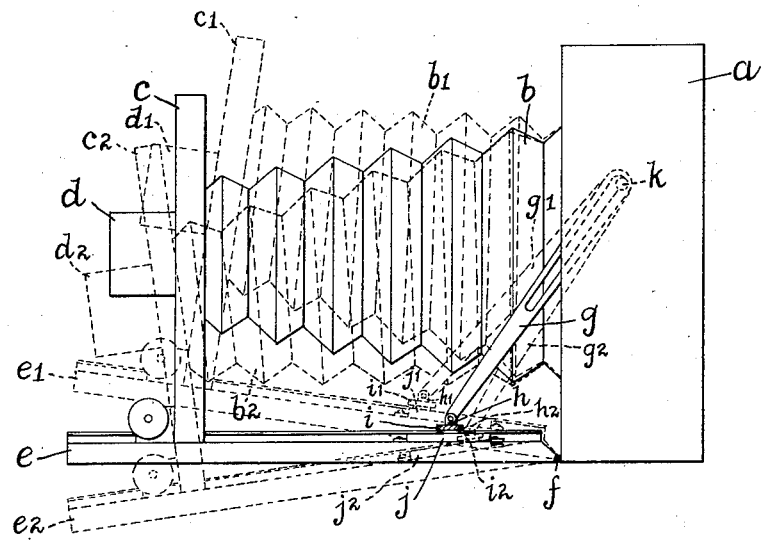
Figure 2:
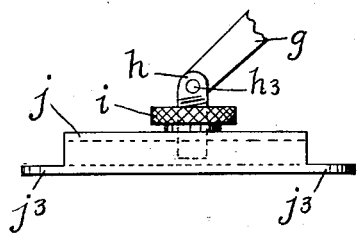
Figure 3:
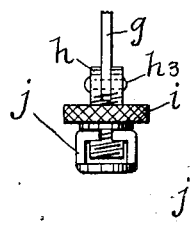
Figures 4, 5:
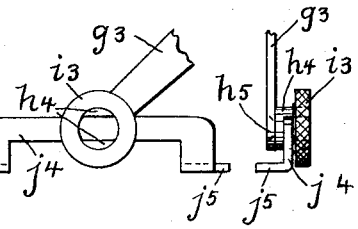

The several views illustrating my invention are as follows:

Figure 1 is a side view of so much of a camera as is necessary to clearly indicate the connection thereto and operation of my invention. Figs. 2 and 3 are side and end views, respectively, of the particular parts made use of to effect the result indicated above. Figs. 4 and 5 show in views similar to Figs. 2 and 3 a modified form of my invention.

Referring to Fig. 1, the camera-back $a$ has hinged thereto at $f$ the camera-bed $e$, to which there is adjustably secured in the usual manner the lens-carriage $c$ or camera-front, which in turn supports the lens $d$. The bellows connected to the camera-back $a$ and the lens-carriage $c$ is shown at $b$. The bed $e$ is secured in the desired position relatively to the camera-back $a$ by means of the metal brace $g$, which is secured to the inside of the back $a$ in the usual manner by the pin $k$. This brace $g$ is pivoted at its lower end at $h^3$ in the upper end of the sliding bolt $h$, and such bolt $h$ is arranged to be held at any desired point in the guide $j$ by means of the nut $i$ thereon. The construction of the bolt $h$, nut $i$, and guide $j$ appears more clearly in Figs. 2 and 3.

As seen in Figs. 2 and 3, the guide $j$ is practically a rectangular tube having a longitudinal slot in the center of its upper face. The bolt $h$ is grooved on its sides, near its lower end, so as to receive and slide upon the upper sides of the guide $j$ on either side of the slot therein. The nut $i$ is located above the guide $j$, so that when such nut is turned down on the bolt $h$ such bolt is pulled up until the top of the tube or guide $j$ is rigidly clamped between the end of the bolt within such tube $j$ and the nut $i$. The guide $j$ has formed on its ends the projections $j^3$ $j^3$, through holes in which are passed screws to secure the same to the bed $e$. The guide $j$ is secured to the bed $e$ in such a position that when the axis of the lens $d$ is perpendicular to the plane of the camera-back $a$ the bolt $h$ will occupy a position about midway between the ends of the guide $j$. When it is desired to secure other adjustments, the nut $i$ is loosened and the bed $e$ is moved either up or down, and when the desired position is secured the bed $e$ is locked in that position by again tightening the nut $i$. The position of the parts for the perpendicular position of the lens-axis and camera-back $a$ is indicated in Fig. 1 in full lines, and two other positions are indicated in dotted lines, one for the lens elevated and the other for the lens depressed, without moving the back $a$. For the elevated and depressed positions of the lens just mentioned the parts $b$ $c$ $d$ $e$ $g$ $h$ $i$ $j$ take the positions indicated at $b'$ $c'$ $d'$ $e'$ $g'$ $h'$ $i'$ $j'$ and $b^2$ $c^2$ $d^2$ $e^2$ $g^2$ $h^2$ $i^2$ $j^2$, respectively.

In Figs. 4 and 5 a modified form of the parts seen in Figs. 2 and 3 is shown. In this case the guide $j^4$ has formed thereon feet $j^5$ $j^5$ for securing the same to the camera-bed. A bolt $h^4$ is slotted at one end, so as to receive the guide $j^4$ therein, and the slotted end is threaded and engaged by the nut $i^3$, which serves to clamp the guide $j^4$ between the bolt $h^4$ and the nut $i^3$ at any desired position. The metal brace $g^3$ is similar to the brace $g$ and is pivotally connected to the bolt $h^4$ at $h^5$. The parts as shown in Figs. 4 and 5 coöperate in practically the same manner to produce practically the same results as the parts shown in Figs. 2 and 3.

It will of course be understood that a brace $g$ and all of its connections, as shown, may be used on the side of the camera away from the observer.

What I claim is—

1. In combination with a camera-back and a camera-bed coöperating and articulating therewith, a guide secured to one of such members and a slide working thereon, means for clamping such slide in any desired position on such guide, and a connecting-brace articulating at one end with such slide and having its other end arranged to articulate upon a pin or stud carried by that one of such first-named elements with which the member carrying such guide articulates, such brace provided with a slot at one end whereby it may slide upon that element with which the slotted end of such brace articulates, to permit of the opening and closing of such camera elements without disturbing the adjustment of such slide in such guides.

2. In combination with a camera-back and a camera-bed articulating and coöperating therewith, a guide carried by and secured to such bed, a slide working on such guide, and a brace articulating at one end with such slide and arranged to articulate at its other end upon a pin or stud carried by such camera-back, such brace provided with a slot at one end whereby it may slide upon that member with which the slotted end of such brace articulates, to permit of the opening and closing of such camera elements without disturbing the adjustment of such slide in such guides.

3. In combination with a camera-back and a camera-bed articulating and coöperating therewith, a guide secured to such bed, a sliding bolt arranged to work upon such guide and to be secured in any desired position thereon, and a connecting-brace articulating at one end with such bolt and arranged to articulate at its other end upon a pin or stud carried by such camera-back, such brace provided with a slot at one end whereby it may slide upon that member with which the slotted end of such brace articulates, to permit of the opening and closing of such camera elements without disturbing the adjustment of such slide in such guides.

4. In a photographic camera in combination with a camera-back and a bed coöperating and articulating therewith, a brace for holding such elements in their opened position, an adjustable slide articulating with one end of such brace, suitable guides for holding such slide, and means for securing such slide in any desired position on such guides, such guides secured to one of such camera elements and connections between the other end of such brace and such other camera element, whereby such camera elements may be opened or closed without disturbing the adjustment of such slide upon such guides.

FRANK B. CASE.

Witnesses:
ALBERT C. BELL,
A. PEARL MOORE.